UNITED STATES PATENT OFFICE.

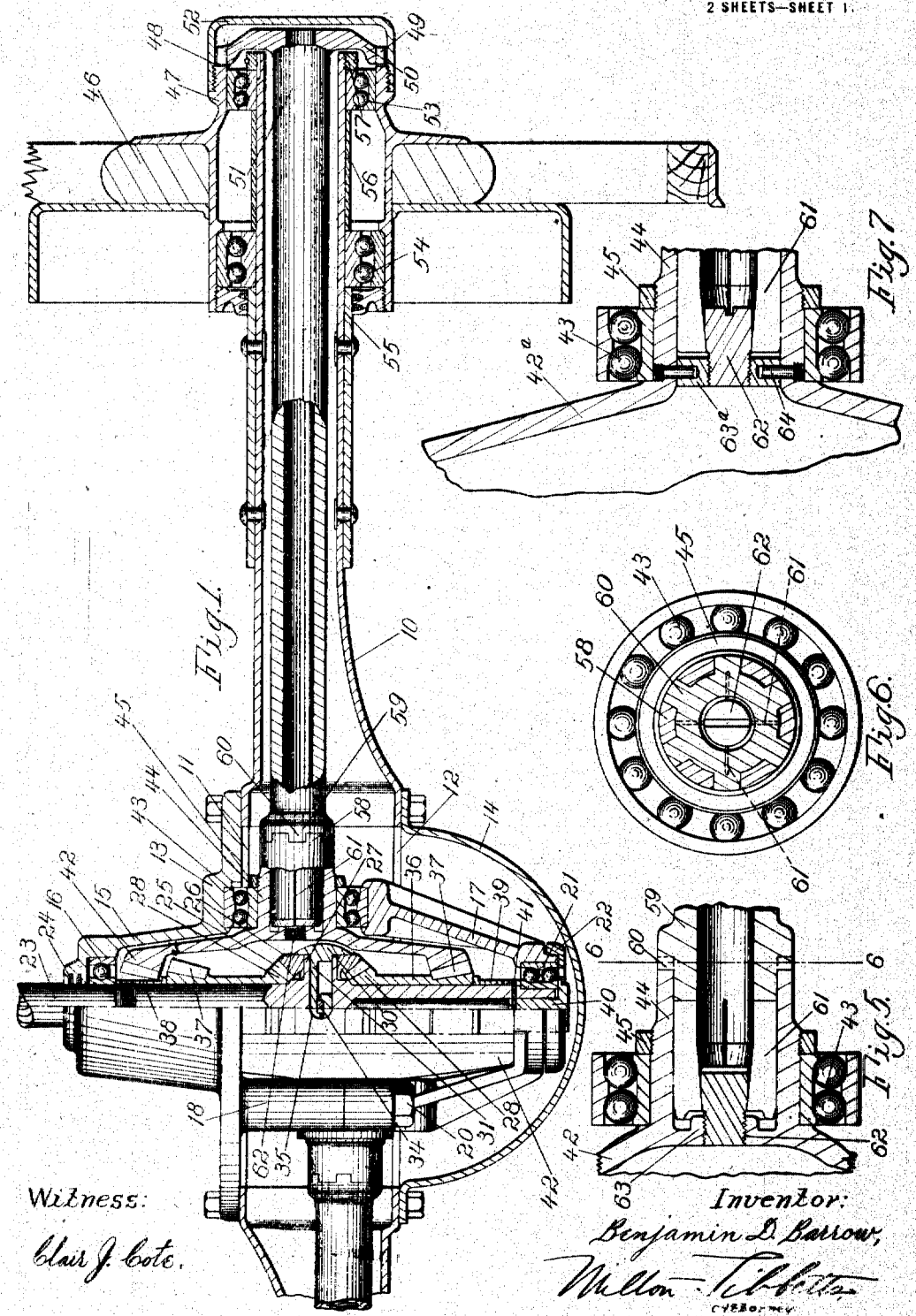

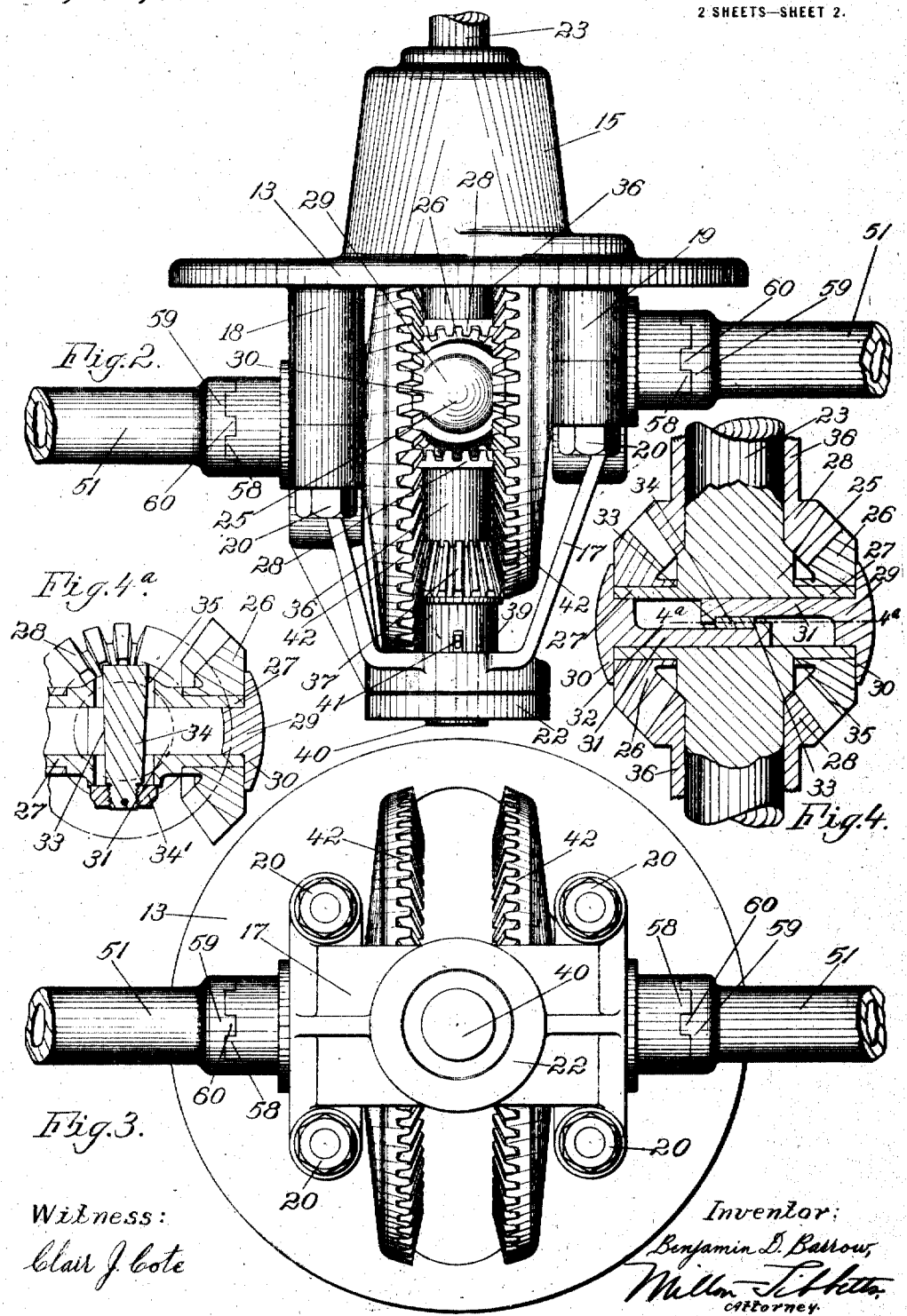

BENJAMIN D. BARROW, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,279,222.　　　Specification of Letters Patent.　　Patented Sept. 17, 1918.

Application filed December 20, 1915.　Serial No. 67,864.

*To all whom it may concern:*

Be it known that I, BENJAMIN D. BARROW, a citizen of the United States, and resident of Detroit, Wayne county, State of Michigan, have invented certain new and useful Improvements in Motor-Vehicles, of which the following is a specification.

This invention relates to motor vehicles, and particularly to driving axles therefor. More especially, the invention relates to that form of driving axle in which the differential is arranged transversely of the axle shaft. Some of the features of the invention, however, are not necessarily limited to such form of axle, but may be used in axles of other types or in other combinations.

One of the objects of the invention is to produce an axle of the above form in which the axle shafts may be axially drawn outwardly from the supporting structure.

Another object of the invention is to produce an axle of the above form in which each of the driving pinions is arranged inside of the gear opposite that with which it is in mesh whereby shorter driving sleeves may be used.

Another object of the invention is to provide a rigidly clutched driving connection between the axle shafts and their respective gears.

Another object of the invention is to produce an axle in which each of the driving shafts is supported at its outer end and has a detachable but rigidly clutched driving connection at its inner end with its respective gear.

Other objects of the invention will appear from the following description taken in connection with the drawings which form a part hereof, and in which:

Figure 1 is a longitudinal section and part plan view of a motor vehicle axle embodying this invention;

Fig. 2 is an enlarged plan view of the gear supporting member of the axle;

Fig. 3 is a rear elevation of the parts shown in Fig. 2;

Fig. 4 is an enlarged detail view of the differential gearing;

Fig. 4ª is a transverse section on the line 4ª—4ª of Fig. 4;

Fig. 5 is a fragmentary enlarged detail view of the expanding clutch connection between the axle shaft and its gear;

Fig. 6 is a transverse section on the line 6—6 of Fig. 5; and

Fig. 7 is a view similar to Fig. 5, showing a modified form of the connection between the axle and its gear.

Referring to the drawings, 10 represents the supporting structure of the axle of a motor vehicle, the middle portion of which structure is enlarged and formed with front and rear openings 11 and 12 respectively. The front opening 11 is closed by a cover 13 which may be in the form of a casting for supporting all of the bearings of the gears and shafts arranged at the middle portion of the axle. The rear opening 12 is closed by a detachable cap 14.

The cover 13 has a forwardly extending part 15 for supporting an annular bearing 16, and there is a detachable rearwardly extending part 17 which is secured to lugs 18 and 19 formed integral with the cover 13, as by bolts 20. This rearwardly extending part or bracket 17 supports an annular bearing unit 21 which is retained therein by a screw cap 22.

A driving shaft 23 extends transversely of the axle through the front end of the forwardly extending part 15 of the cover 13, and is supported on the annular bearings 16 and 21. Suitable packing 24 may be provided at the front end of the extension 15 for the purpose of preventing lubricant from escaping at that point.

Approximately at the middle of that part of the driving shaft 23 which is contained within the axle, is mounted a differential mechanism 25. It is shown in some detail in Figs. 4 and 4ª. This mechanism comprises a pair of differential pinions 26 mounted on laterally extending studs 27, and driven bevel gears 28 in mesh with the pinions 26 and mounted directly on the driving shaft 23. The pinions 26 are retained on the studs 27 by a two-part bolt 29, each of the parts of which comprises a head 30 and a shank 31. These shanks 31 extend into a drilled opening 32 formed through the studs 27 and the shaft 23, the inner ends of the shanks passing each other and being formed with hooks or shoulders 33 between which a wedge 34 may be driven to draw and hold the two parts of the bolt 29 together. The wedge 34 may be inserted and removed through a transverse opening 35 formed in the shaft 23 and it is drawn and held in place by a nut 34'.

Each of the driven bevel gears 28 above referred to is formed as an integral part of a sleeve 36, upon the outer ends of which are bevel driving pinions 37. A thrust sleeve 38 is screwed onto the shaft 23 immediately forward of the front bevel gear 37, as shown particularly in Fig. 1, and a thrust sleeve 39 is arranged on the shaft 23 back of the rear driving pinion 37 and between it and the inner race of the bearing 21. The inner race of said bearing 21 is retained on the shaft 23 by a retaining bolt 40, which is threaded into the rear end of the shaft. A locking device in the form of a cotter pin 41 is shown as extending through the thrust sleeve 39, the shaft 23, and the retaining bolt 40, to thereby lock the bolt in place and prevent rotation of the sleeve 39 on the shaft 23.

A pair of oppositely facing bevel driven gears 42 are mounted in the axle in slightly offset relation to each other, in annular bearing units 43. These bearings 43 are mounted in the cover 13 above referred to by being clamped between the lugs 18 and 19 and the bracket or rearwardly extending part 17 of the cover. Also the bearings are retained on the hubs 44 of the gears 42 by a threaded collar 45.

As above observed, the gears 42 are arranged in offset or staggered relation to each other, and it will be observed that each of them is in mesh with one of the pinions 37. As shown the forward pinion 37 is in mesh with the gear 42 on the left hand side in Fig. 1 and the rear driving pinion 37 is in mesh with the right hand bevel gear 42. Since the left hand gear 42 is arranged rearwardly of a point midway between the axes of the gears 42, and the right hand gear 42 is arranged forwardly thereof, it follows that the forward pinion 37 while meshing with the teeth on the left hand gear 42 is nested within the periphery of the opposite gear. Also the rear pinion 37 being in mesh with the right hand gear 42 is nested within the left hand gear. In other words, each of the pinions 37 is arranged radially inward of the gear opposite the one with which it is in mesh. This arrangement of pinions 37 permits of the use of shorter sleeves 36 between said pinions and the bevel gears 28 of the differential mechanism, thereby decreasing the difficulties of hardening the gears.

At each of the outer ends of the supporting structure 10 is a wheel 46, having a hub 47 the outer end of which is formed with teeth 48 which are arranged to clutch with teeth 49 on a flange 50 of an axle section 51. A hub cap 52 is threaded on the end of the hub 47 to thereby cover the clutch engagement of the hub and axle section and retain lubricant.

The hub 47 and the outer end of the axle section 51 are supported upon the outer end of the axle by a pair of separated bearing units 53, 54. A sleeve 55 on the axle forms an inner abutment for the bearing 54, a sleeve 56 separates that bearing from the bearing 53, and a threaded collar 57 at the end of the axle retains the bearings and consequently the wheel in place.

It will be seen that the connection of the outer end of the axle shaft 51 with the hub 47 is a detachable one and that so far as this connection is concerned the axle shaft 51 may be removed from the axle by simply removing the hub cap 52.

The axle shaft 51 is hollow or of tubular form and is supported at its inner end in the hub 44 of one of the gears 42. It is shown as detachably but rigidly connected to said gear hub by an expanding clutch connection so that there may be no play between these parts. As shown particularly in Figs. 1, 5 and 6, the hub 44 of the gear 42 is formed with clutch teeth 58 and a flange 59 adjacent the inner end of the axle shaft 51 is formed with similar clutch teeth 60 which interlock with the clutch teeth 58. The extreme inner end of the shaft 51 fits snugly within the hollow hub 44 and is split longitudinally as at 61 so that it may be expanded in said hub. Said inner end is also formed interiorly of slightly conical shape and a wedge shaped expanding bolt 62 is inserted through the shaft from its outer end and threaded into the web portion 63 of the gear 42. Thus by using a long screw driver extending through the shaft 51 the expanding bolt 62 may be tightened and the split end of the shaft 51 expanded in the hub 44. This forms a rigid but detachable connection between said shaft 51 and the gear 42.

A slightly modified form of this clutch construction is shown in Fig. 7 in which the gear 42ª instead of being formed with a web portion 63 has the interior of its hub 44 drilled all the way through and a ring 63ª is inserted in the hub and held therein by a series of pins 64 screwed through the hub from the outside. These pins are insured against backing out by having the inner race of the bearing 43 placed on the hub 44 over their heads and retained thereon by the threaded collar 45. The expanding bolt 62 acts the same in this case as in the construction shown in Fig. 5.

Other forms of the invention may also be made without departing from the spirit or scope of the invention.

Having thus described my invention, what

I claim and desire to secure by Letters Patent, is:—

1. In an axle, in combination, a supporting structure, gearing mounted at the middle of said structure, hollow axle shafts, and a detachable connection between each of said shafts and said gearing, said connection being accessible through the shaft from the outer end thereof.

2. In an axle, in combination, a supporting structure, gearing mounted at the middle of said structure, hollow axle shafts, and an expanding clutch connection accessible through the shaft between each of said shafts and said gearing.

3. In an axle, in combination, a supporting structure, a gear at the middle part of said structure having a hub, an axle shaft having a split end adapted to fit within said hub, interlocking connections between said shaft and hub, and means expanding said split end in said hub.

4. In an axle, in combination, a supporting structure, a gear at the middle part of said structure having a hub, an axle shaft having a split end adapted to fit within said hub, interlocking connections between said shaft and hub, and a taper screw for expanding said split end in said hub.

5. In an axle, in combination, a supporting structure, a gear mounted in said structure and having a hub, a hollow axle shaft having a split end adapted to fit within the hub, and a member within said shaft adapted to engage said hub and to expand the split end of the shaft into fixed relation with the hub.

6. In an axle, in combination, a supporting structure, a gear mounted in said structure and having a hub, said hub having a screw threaded opening, a hollow axle shaft having a split end, adapted to fit within the hub, and a screw threaded member within said shaft adapted to engage the opening in said hub and to expand the split end of the shaft into fixed relation with the hub.

7. In an axle, in combination, a supporting structure, a gear in said structure, bearings for said gear, a ring within the hub of said gear, screws for holding said ring in fixed position, the heads of said screws being under said bearings, an axle shaft having a split end adapted to fit into said hub, interlocking connections between said hub and said shaft and means for expanding said split end in said hub.

8. In an axle, in combination, a supporting structure, a gear in said structure, bearings for said gear, a ring within the hub of said gear having a threaded opening, screws for holding said ring in fixed position, the heads of said screws being under said bearings, an axle shaft having a split end adapted to fit into said hub, interlocking connections between said hub and said shaft, and tapered screw threaded means adapted to engage the opening in said ring and expand the split end of said shaft.

9. In an axle, in combination, a supporting structure, a gear in said structure having a hub, a ring within said hub, screws for holding said ring in place, an axle shaft adapted to enter said hub, and means connecting said shaft and ring.

10. In an axle, in combination, a supporting structure, a gear in said structure having a hub, a ring within said hub, screws for holding said ring in place, a hollow axle shaft having a split end adapted to enter said hub, and means contacting with said split end and said ring for expanding said shaft.

11. In an axle, in combination, a supporting structure, a gear in said structure having a hub, a ring within said hub, screws for holding said ring in place, a hollow axle shaft having a split end adapted to enter said hub, and interlocking means for connecting said shaft and hub.

12. The combination with a driving shaft having differential gears thereon, of a retaining bolt for part of said gears comprising two parts each having a head and a shank, and a wedge coöperating with the shanks to draw the heads toward each other.

13. The combination with a driving shaft having a pair of driving pinions thereon, differential gearing connecting said pinions, said gearing including a pair of bevel gears arranged with their axes passing through said shaft, a two-part retaining bolt for said bevel gears, and a pin for locking the two parts of said bolt together.

14. The combination with a driving shaft having a pair of driving pinions thereon, differential gearing connecting said pinions, said gearing including a pair of bevel gears arranged with their axes passing through said shaft, a two-part retaining bolt for said bevel gears, and a wedge shaped pin for drawing and locking the two parts of said bolt together.

15. In an axle, in combination, a supporting structure, a pair of axle shafts, arranged in offset and substantially parallel relation, oppositely facing bevel gears on the inner ends of said axle shafts, a lateral driving shaft arranged between said gears, and bevel pinions on said driving shaft in mesh with the respective gears, each pinion being in mesh with that side of its gear that is nearest to a point midway between the pinions.

16. In an axle, in combination, a supporting structure, a pair of axle shafts arranged in offset and substantially parallel relation, oppositely facing bevel gears on the inner ends of said axle shafts, a lateral driving shaft arranged between said gears, and bevel pinions on said driving shaft in mesh with the respective gears, each pinion being arranged inside of the gear with which it is out of mesh.

17. In an axle, in combination, a supporting structure, a pair of axle shafts arranged in offset and substantially parallel relation, oppositely facing bevel gears on the inner ends of said axle shafts, a lateral driving shaft arranged between said gears, and bevel pinions on said driving shaft in mesh with the respective gears, each pinion being arranged within the periphery of the gear with which it is not in mesh.

18. In an axle, in combination, a supporting structure, a pair of axle shafts arranged in offset and substantially parallel relation, oppositely facing bevel gears on the inner ends of said axle shafts, a lateral driving shaft arranged between said gears, and bevel pinions on said driving shaft in mesh with the respective gears, each pinion being nested within the opposite gear.

19. In an axle, in combination, a supporting structure, a pair of axle shafts arranged in offset and substantially parallel relation, oppositely facing bevel gears in the inner ends of said axle shafts, a lateral driving shaft arranged between said gears, and bevel pinions on said driving shaft in mesh with the respective gears, each pinion being arranged radially inward of the gear opposite the one with which it is in mesh.

20. In an axle, in combination, a supporting structure, a pair of oppositely facing bevel gears arranged with their axes slightly offset and substantially parallel, a lateral driving shaft between said gears, and bevel pinions on said driving shaft each in mesh with the innermost side of a bevel gear.

21. In an axle, in combination, a supporting structure, a pair of oppositely facing bevel gears arranged with their axes slightly offset and substantially parallel, a lateral driving shaft between said gears, and bevel pinions on said driving shaft each in mesh with one of said gears, each pinion being arranged within the periphery of the gear opposite the one with which it is in mesh.

22. In an axle, in combination, a supporting structure, a pair of oppositely facing bevel gears arranged with their axes slightly offset and substantially parallel, a lateral driving shaft between said gears, differential gearing on said shaft, and pinions driven by said gearing and in mesh with said gears, each pinion being arranged within the periphery of the opposite gear.

23. In an axle, in combination, a supporting structure, a pair of oppositely facing bevel gears arranged with their axes slightly offset and substantially parallel, a lateral driving shaft between said gears, bearings for said shaft beyond the peripheries of both said gears, and a pinion on said shaft in mesh with each gear and inside the teeth of the opposite gear.

24. In an axle, in combination, a supporting structure, oppositely facing bevel gears arranged with their axes slightly offset and substantially parallel, a lateral driving shaft between said gears, bearings for said shaft immediately outside of said gears, differential gearing on said shaft, driving pinions operated by said gearing, and a sleeve between each said pinion and the adjacent bearing.

25. In an axle, in combination, a supporting structure, oppositely facing bevel gears arranged with their axes slightly offset and substantially parallel, a lateral driving shaft between said gears, bearings for said shaft immediately outside of said gears, differential gearing on said shaft, driving pinions operated by said gearing, and a sleeve secured to the shaft between each said pinion and the adjacent bearing.

26. In an axle, in combination, a supporting structure, oppositely facing bevel gears arranged with their axes slightly offset and substantially parallel, a lateral driving shaft between said gears, bearings for said shaft immediately outside of said gears, differential gearing on said shaft, driving pinions operated by said gearing, and a thrust sleeve for each said pinion adjacent the teeth of the opposite gear.

27. In an axle, in combination, a supporting structure, oppositely facing bevel gears arranged with their axes slightly offset and substantially parallel, a lateral driving shaft between said gears, bearings for said shaft immediately outside of said gears, differential gearing on said shaft, driving pinions operated by said gearing each pinion being in mesh with one gear and radially inward of the opposite gear, and a thrust sleeve between each said pinion and the adjacent bearing.

28. In an axle, in combination, a supporting structure, a gear mounted in an annular bearing at the middle part of said structure, an axle shaft, and a wheel connected thereto, an annular bearing supporting said wheel and the outer end of said shaft at one end of said structure, said shaft having its inner end supported by said gear, and a detachable but rigidly clutched driving connection between said gear and shaft.

29. In an axle, in combination, a supporting structure, a gear mounted in an annular bearing directly in and at the middle part of said structure, an axle shaft in said structure being adapted to be assembled therein only from the end of the structure inwardly, a wheel connected to the outer end of said shaft, an annular bearing for supporting said wheel and the outer end of said shaft at one end of said structure, said shaft having its inner end supported by said gear, and a direct driving connection between said gear and shaft.

30. In an axle, in combination, a supporting structure, a gear mounted on a bearing unit at the middle of said structure, an axle shaft mounted in said structure and supported at its outer end at one end of the structure, and a detachable but rigidly clutched driving connection between said gear and shaft.

31. In an axle, in combination, a supporting structure, a gear mounted on a bearing unit at the middle of said structure, an axle shaft mounted in said structure and having its outer end supported at one end of the structure, and a detachable but rigidly clutched driving connection between said gear and shaft, said connection being accessible through the shaft from the outer end thereof.

32. In an axle, in combination, a supporting structure, oppositely facing bevel gears in said structure, a lateral driving shaft between said gears, bearings for said shaft outside of said gears, driving pinions on said shaft and in mesh with the respective gears, a bearing retaining piece for one of said bearings, a thrust piece for one of said pinions, and a single locking device for both of said pieces.

33. In an axle, in combination, a supporting structure, oppositely facing bevel gears in said structure, a lateral driving shaft between said gears, bearings for said shaft outside of said gears, driving pinions on said shaft and in mesh with the respective gears, a bearing retaining piece for one of said bearings, a thrust piece for one of said pinions, and a single locking device adapted to prevent both said pieces turning relative to the driving shaft.

34. In an axle, in combination, a supporting structure, a gear mounted on a bearing unit at the middle of said structure, a wheel mounted on bearings at one end of said structure, an axle shaft having its outer end connected to and supported by said wheel, and a detachable but rigidly clutched driving connection between said gear and shaft.

35. In an axle, in combination, a supporting structure, a gear mounted on a bearing unit directly in and at the middle of said structure, a wheel mounted on bearings at one end of said structure, an axle shaft having its outer end connected to and supported by said wheel and having its inner end detachably connected directly to said gear.

In testimony whereof I affix my signature.

BENJAMIN D. BARROW.